May 19, 1931. L. J. BROCHE 1,806,445
METHOD AND APPARATUS FOR USE IN THE MANUFACTURE OF GLASSWARE
Original Filed Dec. 27, 1928
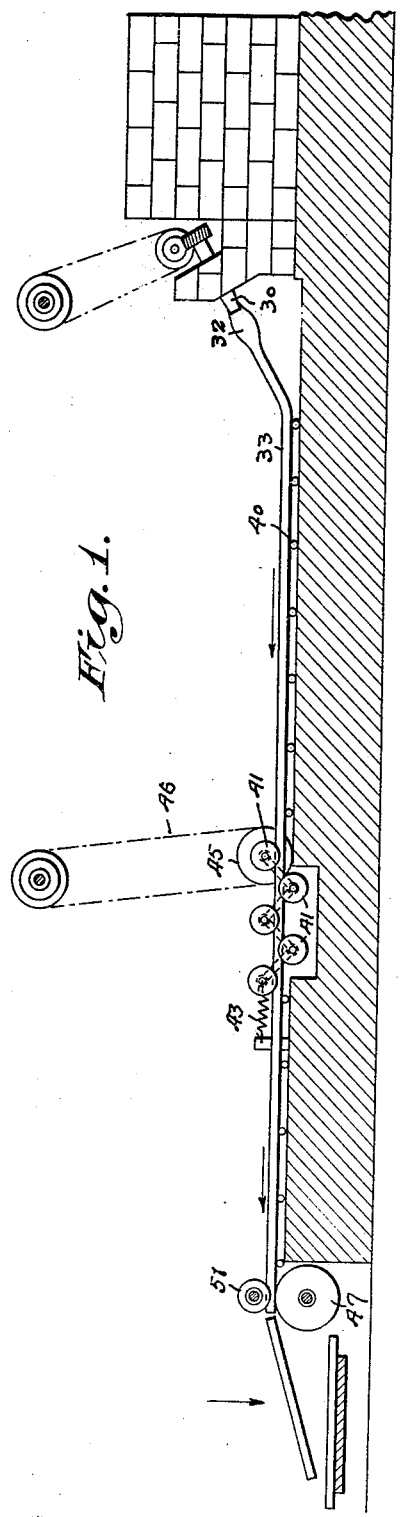
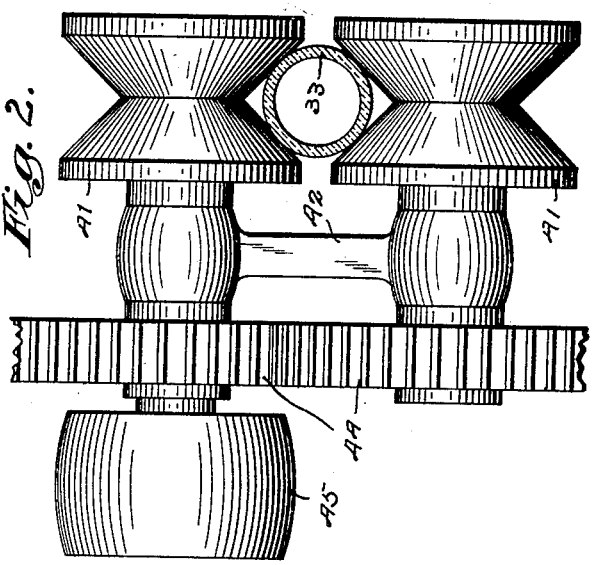
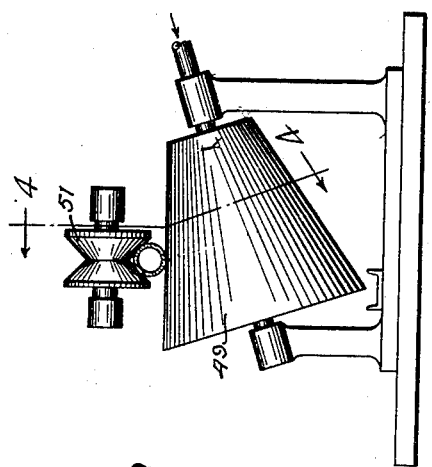
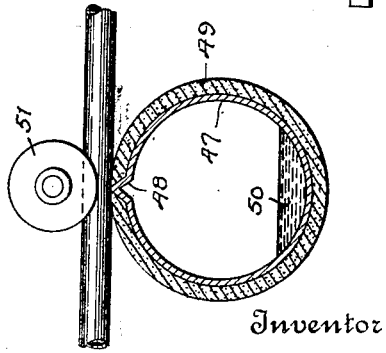
Inventor
LEON J. BROCHE
By his Attorneys Patented May 19, 1931

1,806,445

UNITED STATES PATENT OFFICE

LÉON JEAN BROCHE, OF VERRIERES-LE-BUISSON, FRANCE, ASSIGNOR TO TROPENAS COMPANY, OF NEW YORK, N. Y., A CORPORATION OF DELAWARE

METHOD AND APPARATUS FOR USE IN THE MANUFACTURE OF GLASSWARE

Original application filed September 20, 1926, Serial No. 136,632. Divided and this application filed December 27, 1928, Serial No. 328,776. Renewed October 15, 1930.

My invention relates to the drawing of continuous glass products fed from the forehearth of the furnace and to the cutting of such products.

The objects of the invention are (1) to provide an improved mechanism for impelling the continuous product along the desired path after its delivery from the forehearth; (2) to provide an improved device for cutting the continuous product into sections of desired length as it is being impelled along.

This application is a division of my copending application, Serial No. 136,632 filed September 20, 1926. The present invention may be used with the type of feeder shown in that application or with the feeder shown in my Patent Number 1,670,058, or it may be used with other types of feeder.

The preferred embodiment of the invention is described hereinafter and is illustrated in the accompanying drawing which was a part of my application Serial No. 136,632 mentioned above.

In the drawings—

Figure 1 is a more or less schematic side elevation of a tube-making layout, with drawing and cut-off mechanism embodying my invention;

Figure 2 is a section through the drawing mechanism to a larger scale;

Figure 3 is a section showing the cut-off mechanism to a larger scale;

Figure 4 is a section on the line 4—4, Fig. 3.

The glass is delivered from the forehearth of the furnace A by any suitable feeder. As illustrated here, in Figure 1, the feeder is a rotor having an axial boss 30 on which the molten glass, picked up from the forehearth by the rotor, gathers in an annular mass 32. If air is delivered to the mass as it gathers, the resulting product is hollow; otherwise, the product is drawn off from the feeder as a solid rod. The description following refers to a hollow product or tube.

The continuous tube 33 is led from the feeder over a number of supporting rolls 40 to a set of drawing rolls 41, staggered with relation to each other and located on opposite sides of the product. These rolls are connected together by links 42 and are drawn into gripping engagement with the product by a spring 43, the stress of which is adjustable. Meshing gears 44 on the several roll shafts drive the rolls in unison. A pulley 45 on the shaft of one of the rolls may be engaged by a driving belt 46, but any suitable driving mechanism may be employed. The drawing rolls have V-grooved faces as shown in Figures 2 and 3.

Passing beyond the drawing rolls 41, the product is caused to pass over a rotary cutter. This cutter is in the form of a hollow cone 47 formed of metal and having a projecting longitudinal rib 48. The outer face of the cone 47 is jacketed with heat-insulating material 49 of a thickness substantially equal to the height of the rib 48, but leaves the edge of the latter exposed. A cooling medium, such as water 50, is preferably flowed continuously through the cutting roll, to keep its shell 47 and rib 48 chilled. The still hot, though substantially rigid, product passing over the cutting roll and held in contact therewith by the backing roll 51, comes periodically into contact with the chilled rib 48 of the cutting roll and is thereby fractured. By adjusting the cone 47 transversely of travel of the product, the lengths of the rod or tube sections are varied to meet requirements.

The invention comprehends variations from the embodiment described above within the fair scope of the following claims.

I claim—

1. In the manufacture of glass products, the step of severing a continuous product into lengths, which comprises advancing the material while hot upon a movable support and bringing a defined chilled area of said support intermittently into contact with the product to fracture the latter.

2. In apparatus for the manufacture of glass products, an appliance for drawing continuous products, said appliance comprising a group of staggered rolls linked together, spring means to stress the rolls against the product, and means to positively drive the rolls in unison.

3. In apparatus for the manufacture of glass products, an appliance for cutting continuous products into lengths, said appliance comprising a roll having a peripheral rib, a jacket sheathing the roll with the exception of said rib, means for chilling the roll, and means for passing the hot continuous product over the roll.

4. In apparatus for the manufacture of glass products, an appliance for cutting continuous products into lengths, said appliance comprising a conical roll having a peripheral rib, a jacket sheathing the roll with the exception of said rib, means for chilling the roll, and means for passing the hot continuous product over the roll.

5. In apparatus for the manufacture of glass products, an appliance for cutting continuous products into lengths, said appliance comprising a roll having a peripheral rib, a jacket sheathing the roll with the exception of said rib, means for water cooling the roll, and means for passing the hot continuous product over the roll.

In testimony whereof I have signed my name to this specification.

LÉON JEAN BROCHE.